No. 739,579.

Patented September 22, 1903.

UNITED STATES PATENT OFFICE.

RENÉ BOHN, OF MANNHEIM, GERMANY, ASSIGNOR TO BADISCHE ANILIN AND SODA FABRIK, OF LUDWIGSHAFEN-ON-THE-RHINE, GERMANY, A CORPORATION.

BLUE COLORING-MATTER.

SPECIFICATION forming part of Letters Patent No. 739,579, dated September 22, 1903.

Application filed July 9, 1902. Serial No. 114,927. (No specimens.)

*To all whom it may concern:*

Be it known that I, RENÉ BOHN, doctor of philosophy and chemist, a citizen of the Swiss Republic, residing at Mannheim, in the Grand Duchy of Baden, Germany, have invented new and useful Improvements in Blue Coloring-Matter, of which the following is a specification.

Beta-amido-anthraquinone on being fused at a suitable temperature with caustic alkali or with caustic alkali and a suitable oxidizing agent or on being suitably oxidized in acid solution yields a blue coloring-matter, which may be practically pure or may consist of a mixture of coloring-matters. The said blue coloring-matter results, for instance, on fusing one part of beta-amido-anthraquinone with five parts of caustic potash for half an hour at a temperature of 250° centigrade, pouring the melt into water, blowing air through the solution obtained, collecting by filtration the precipitate which separates out and washing well, or by fusing one part of beta-amido-anthraquinone with from two to five parts of caustic potash and one-fifth part of potassium nitrate and proceeding as aforesaid. To purify the coloring-matter, take so much of the well-washed paste as corresponds to ten parts of the dry product, mix it with one thousand parts of water and warm the mixture to about 60° to 70° centigrade. Add thereto twenty parts of caustic-soda lye (containing about twenty-four per cent. of NaOH) and one hundred and fifty parts of sodium hydrosulfite solution (containing five to six per cent. of the salt) and maintain the temperature at from 60° to 70° centigrade for about one hour or until the coloring-matter is completely dissolved. When this stage is reached, cool the solution and allow it to stand for several hours. The sodium salt of the hydro or soluble form separates out. Collect it by filtration, remove the paste from the filter, boil it with water, filter again, and wash well till free from alkali and dry. I will refer to this coloring-matter so obtained as the beta-amido-anthraquinone coloring-matter. The said beta-amido-anthraquinone coloring-matter in the hydro or reduced form dyes unmordanted cotton blue shades of great beauty and fastness, the said shades, however, becoming greenish when treated for one to two minutes at a temperature of about 15° to 20° centigrade with a dilute solution of sodium hypochlorite the strength of which is equivalent to one-eighth to one-fourth per cent. of active chlorin.

I have discovered a derivative of the aforesaid beta-amido-anthraquinone coloring-matter which is distinguished from the parent material and from all other coloring-matters by the fact that in the form of its hydro compound it dyes unmordanted cotton blue shades, which shades on development by exposure to the air for a sufficient length of time, followed by treatment at a temperature of 15° centigrade for about ten minutes with a dilute solution of sodium hypochlorite the strength of which is equivalent to one-fourth per cent. of active chlorin, remain practically unchanged. I obtain my said derivative by treating the beta-amido-anthraquinone coloring-matter with chlorin or bromin or with a body or mixture of bodies which generates such halogens.

My new coloring-matter is practically insoluble in water and is more easily soluble in nitrobenzene than is the parent beta-amido-anthraquinone coloring-matter. On reducing the new derivative with a suitable reducing agent—say sodium hydrosulfite and caustic soda at a temperature of 50° to 60° centigrade—it yields a soluble hydro compound with the aforementioned properties.

The following example will serve to further illustrate the nature of this invention and the manner in which the same may be carried into practical effect; but the invention is not confined to the example. The parts are by weight:

Example: Dissolve in two hundred (200) parts of concentrated sulfuric acid (containing ninety-six per cent. of $H_2SO_4$) ten (10) parts of beta-amido-anthraquinone coloring-matter. Heat this solution to from sixty (60°) to eighty (80°) degrees centigrade and gradually add thereto while stirring six (6) parts of bromin. Maintain the temperature for from fifteen (15) to twenty-four (24) hours, pour the mass into ice-water, and collect by filtration the coloring-matter which separates out. In place of sulfuric acid any other suitable solvent can be employed, and in place of bromin the corresponding quantity of chlorin can be used. On treating one (1) part in paste form of the coloring-matter thus obtained, which is suspended in five hundred to one thousand (500 to 1,000) parts of water at a temperature of from fifty to sixty degrees, (50° to 60° centigrade,) with twenty to thirty (20 to 30) parts of a sodium hydrosulfite solution containing about ten (10) per cent. of $Na_2S_2O_4$ and from ten to fifteen (10 to 15) parts of caustic-soda lye containing about twenty-four (24) per cent. NaOH the coloring-matter will dissolve in the form of its hydro compound and dye cotton as aforesaid.

What I claim is—

The coloring-matter such as can be obtained from the hereinbefore-described beta-amido-anthraquinone coloring-matter by treatment with halogen, which in the form of its hydro compound, dyes unmordanted cotton blue shades which on development with air and then treatment with a solution of sodium hypochlorite the strength of which is equivalent to one-fourth per cent. of active chlorin, for ten minutes at a temperature of about fifteen (15°) degrees centigrade, remain practically unchanged.

In testimony whereof I have hereunto set my hand in the presence of two subscribing witnesses.

RENÉ BOHN.

Witnesses:
JOHN L. HEINKE,
JACOB ADRIAN.